(12) United States Patent
Kiontke et al.

(10) Patent No.: US 9,547,177 B2
(45) Date of Patent: Jan. 17, 2017

(54) REFRACTIVE BEAM SHAPER

(71) Applicant: asphericon GmbH, Jena (DE)

(72) Inventors: Sven Kiontke, Jena (DE); Ulrike Fuchs, Jena (DE); Jens Moritz, Jena (DE)

(73) Assignee: asphericon GmbH, Jena (DE)

(*) Notice: Subject to any disclaimer, the term of this patent is extended or adjusted under 35 U.S.C. 154(b) by 370 days.

(21) Appl. No.: 14/250,243

(22) Filed: Apr. 10, 2014

(65) Prior Publication Data

US 2016/0161751 A1 Jun. 9, 2016

(30) Foreign Application Priority Data

Apr. 11, 2013 (DE) .................. 10 2013 206 394

(51) Int. Cl.
| | | |
|---|---|---|
| *G02B 27/30* | (2006.01) | |
| *G02B 3/02* | (2006.01) | |
| *G02B 27/09* | (2006.01) | |
| *G02B 3/04* | (2006.01) | |
| *G02B 7/02* | (2006.01) | |
| *G02B 27/00* | (2006.01) | |

(52) U.S. Cl.
CPC ............ *G02B 27/0955* (2013.01); *G02B 3/04* (2013.01); *G02B 7/021* (2013.01); *G02B 27/0025* (2013.01); *G02B 27/30* (2013.01)

(58) Field of Classification Search
CPC ... G02B 27/09; G02B 27/0938; G02B 27/095; G02B 27/0955; G02B 27/0961; G02B 27/30; G02B 3/02; G02B 3/04

USPC .................................................. 359/641, 708
See application file for complete search history.

(56) References Cited

U.S. PATENT DOCUMENTS

| | | | |
|---|---|---|---|
| 4,609,262 A | | 9/1986 | Fujikawa et al. |
| 5,134,523 A | | 7/1992 | Cobb |
| 5,251,060 A | | 10/1993 | Uenishi et al. |
| 5,327,283 A | | 7/1994 | Zobel |
| 5,654,831 A | | 8/1997 | Byren et al. |
| 5,850,310 A | | 12/1998 | Schweizer |
| 6,061,183 A | * | 5/2000 | Nakai ................ G02B 26/124 359/206.1 |
| 6,628,463 B2 | | 9/2003 | Koike |
| 2002/0027723 A1 | | 3/2002 | Lei |
| 2010/0157441 A1 | | 6/2010 | Kweon |
| 2010/0254020 A1 | * | 10/2010 | Govyadinov ...... G02B 27/0944 359/641 |

FOREIGN PATENT DOCUMENTS

| | | |
|---|---|---|
| DE | 691 06 569 T2 | 7/1995 |
| DE | 196 35 792 A1 | 4/1997 |
| EP | 0 240 194 A1 | 10/1987 |

(Continued)

*Primary Examiner* — William Choi
(74) *Attorney, Agent, or Firm* — Christensen Fonder P.A.

(57) ABSTRACT

A refractive beam shaper that includes multiple meniscus lenses arranged along their optical axes. Each meniscus lens has a concavely curved surface for entry or exit of a light beam and a convexly curved surface for exit or entry of the light beam. Both surfaces have curvatures such that a collimated light beam entering the respective meniscus lens parallel to an optical axis thereof exits again, as a collimated light beam, with a diameter that is altered compared with the entering light beam. To prevent aberrations, at least one of the two surfaces of each meniscus lens has a predetermined aspherical shape.

23 Claims, 6 Drawing Sheets

(56) References Cited

FOREIGN PATENT DOCUMENTS

| | | |
|---|---|---|
| EP | 0 571 725 A1 | 12/1993 |
| EP | 0 681 194 A1 | 11/1995 |
| JP | 60-129703 A | 7/1985 |
| JP | 2012-145687 A | 8/2012 |

* cited by examiner

REFRACTIVE BEAM SHAPER

PRIORITY CLAIM

The present application claims priority to German Patent Application No. 10 2013 206 394.6, filed on Apr. 11, 2013, which said application is incorporated by reference in its entirety herein.

FIELD OF THE INVENTION

The invention relates to a refractive beam shaper. Such beam shapers are used in various fields of optics. Beam shapers which expand or compress the diameter of the laser beam while maintaining the collimation—so-called beam expanders or beam compressors—have an important role to play in connection with the use of laser beams, as the magnification of the beam diameter in particular is very important for many applications because, in this way, the best possible use can be made of the clear aperture of the optical system into which the laser beam is to be coupled.

BACKGROUND OF THE INVENTION

For this, as regards refractive beam shapers, various optical systems are known in the state of the art. They usually use at least two lenses and are based on the principle of a Keplerian or Galilean telescope.

Thus, for example, in EP 0 240 194 A1 an afocal beam expander is described which is constructed from a negative lens element and a positive lens element which are spaced apart from each other. The two lens elements consist of different materials which are selected such that temperature-related changes in the refractive indices of the two elements are compensated for. Different lens pairs are described for different changes in the diameter of the beam, the curvatures of the lens surfaces can be spherical or aspherical. Different lens combinations must thus be used for different magnifications, and a renewed adjustment must take place after each change.

In DE 691 06 569 T2 an achromatic zoom beam expander is described. This consists of three individually color-corrected component pairs, wherein one component pair is arranged fixed and the other two component pairs can be moved relative to the fixed component pair and relative to each other. An adjustable magnification can be realized in this way, this is a beam expander of the Galilean telescope type, which expands a collimated laser beam to a, likewise collimated, laser beam with a larger cross-section.

With the device described in DE 691 06 569 T2, although different magnifications can be variably set, this system requires three lens groups of two lenses cemented together each, thus a total of six lenses. For one thing, this makes the structure complicated and, for another, because of the number of at least six lenses, it is more costly than the solution described in the unexamined European patent application EP 0 240 194 A1, in which, for example, one of the two lenses is changed to set another magnification. In addition, the solution described in DE 691 06 569 T2 is not suitable for use with those lasers that have a high power output. This could result in damage to the lens group, as the cementing of the individual lenses to form a lens group reacts more sensitively than the glass of the lenses; but also glasses no longer withstand particularly high powers, with the result that in this case a switch is made to catadioptric systems.

SUMMARY OF THE INVENTION

Simultaneously realizing a high flexibility in the magnification on the one hand and a mechanical or thermal stability of a beam shaper on the other with the solutions known in the state of the art is not possible or is only possible with very high technical outlay.

An object of the invention is therefore to develop a refractive beam shaper which functions with as small as possible a number of optical elements. It is to be possible even for people without experience in dealing with beam shapers to set different magnifications in a simple manner, in particular a change in the magnification or demagnification is to function without a renewed adjustment of the optical elements relative to each other.

A refractive beam shaper which achieves this object has the following features: It comprises several meniscus lenses, arranged along their optical axes, which have in each case a concavely curved surface for the entry or exit of a light beam and a convexly curved surface for the exit or entry of the light beam. Both surfaces of each meniscus lens have such curvatures that a collimated light beam entering the meniscus lens parallel to an optical axis thereof exits the meniscus lens as a collimated light beam having a diameter that is altered compared with the entering light beam. To prevent aberrations, at least one of the two surfaces has a predetermined aspherical shape. In the simplest case the beam shaper is a monolithic optical element, a single meniscus lens shaped in a way that is already sufficient to realize a fixed magnification or demagnification.

In an embodiment, the meniscus lenses are so-called null lenses in which the two optically active surfaces are concentrically curved, wherein the term "concentrically" in connection with an aspherical surface relates to a spherical surface which comes closest to the aspherical shape, as an approximation, in the sense that the distances of the points on the aspherical surface to the spherical surface are smallest in the center. Depending on where the beam enters the lens, its diameter is either magnified or demagnified. If the light beam enters the meniscus lens on the concavely curved surface and exits the lens again on the convexly curved surface, the beam diameter is magnified. If, on the other hand, the light beam enters the lens on the convexly curved surface and exits the meniscus lens again on the concavely curved surface, the beam diameter is demagnified. It must be ensured that the at least one meniscus lens is an afocal element, i.e., a collimated light beam, more precisely a bundle of parallel light beams, which enters the meniscus lens, leaves it again as a collimated light beam or as a bundle of parallel light beams, but with a changed diameter.

While, in the state of the art, to prevent aberrations—by which are meant in particular spherical aberration, astigmatism and coma—at least two lenses are needed to be able to magnify at least beam diameters in the range of up to 3 mm. Such aberrations can be prevented if at least one of the two surfaces is aspherically shaped according to predetermined conditions. Spherical aberrations are prevented, or, if starting from an imaginary, originally spherical surface, corrected by the aspherical shaping. Compared with the use of a meniscus lens with two spherical surfaces, with the refractive beam shaper according to the invention, light beams, in particular laser beams with a starting diameter of more than 5 mm, can also be magnified without imaging errors occurring.

The aspherical shape of the respective surface is defined by a predetermined set of parameters and a function, in which this set of parameters is adopted. It is possible either for one of the two surfaces to be spherically shaped and the other to be aspherically shaped or else for both surfaces, thus both the concavely curved and the convexly curved surface, to be aspherically shaped. Each one aspherically curved surface is expediently described by an aspheric function z(h) as the distance to a straight line normal to the optical axis, wherein the aspheric function z(h) can be defined in different ways and can be understood as a correction function instead of a function describing a spherically shaped lens. The variable h indicates the distance to the optical axis on the straight line. With the help of the predetermined set of parameters and taking into account the rotational symmetry of the aspherically shaped surface in respect of the optical axis, the aspheric function clearly describes the aspherically curved surface. The set of predetermined parameters comprises, for example, the following variables: (i) a minimum, local radius r of the concavely curved surface, (ii) the center thickness of the meniscus lens on the optical axis, i.e., the thickness of the lens along this axis; (iii) a material, for example, glass or plastic, from which the meniscus lens is manufactured; (iv) the aspect ratio, i.e., the ratio of the center thickness to the diameter of the meniscus lens, alternatively, also the diameter of the meniscus lens. As a further condition, it is also adopted that before entering the lens and after exiting the lens the light runs in each case as a collimated beam.

If the concave surface is spherically curved, the local radius r is identical at every point on the surface. If the concave surface is aspherically curved, the radius r is no longer a constant, but varies over the entire distance of the optical axis, wherein the local value at a particular position results from the curvature in the immediate vicinity of this position. The lower limit, the minimum radius, can in principle be freely chosen, but as a rule is defined using manufacturing criteria. The local radii in the case of an aspherical surface are not necessarily concentric, thus do not necessarily relate to a common central point.

Even in the case that the concave surface is aspherically shaped, the specification of the minimum, local radius of this surface is sufficient to determine the radius of a spherically convex surface, as it is then clearly defined in relation to this minimum radius using the predetermination of the center thickness taking into account the concentric arrangement of the surfaces.

In the case of two aspherical surfaces, this specification is no longer sufficient to define the surfaces because of the added degrees of freedom, here as a further condition an intensity distribution of the exiting light beam is then predetermined as a profile or parameter field for determining the surfaces, whether, e.g., in cross-section the exiting beam is to have an almost homogeneous intensity profile or an intensity profile following a Gaussian distribution. The almost homogeneous intensity profile of the light beam is approximated by an intensity profile which follows a higher-order Gaussian distribution, a so-called super-Gaussian distribution. Because of its shape, this intensity profile is also called a top-hat profile. All profile shapes between a normal Gaussian distribution and a top-hat profile, i.e., lower-order Gaussian distributions, other than the top-hat profile can also be predetermined as intensity distribution, should it be necessary.

Because of the complexity of the aspheric function, this is, or the coefficients which describe the function are, determined iteratively. The predetermination of the set of parameters ensures that the surface defined in each case by the function z(h) is clearly determined, wherein depending on the choice of the function the coefficients determining this can optionally also be clearly determined.

In a particularly preferred design, the concavely curved surface is spherically shaped and the convexly curved surface has a predetermined aspherical shape; this has manufacturing advantages because of the easier availability of the convex surface by machines during the production of the surfaces of the meniscus lens. The convexly curved, aspherically shaped surface can be described by the relationship of Equation 1:

$$z(h) = \frac{h^2}{R\left(1 + \sqrt{1-(1+K)\frac{h^2}{R^2}}\right)} + \sum_{i=2}^{N} A_{2i} h^{2i} \qquad \text{Equation 1}$$

wherein K is the so-called conic constant, i and N are natural numbers and $A_{2i}$ are the coefficients of a polynomial in h. R indicates the radius of an imaginary conic section surface at the peak of this surface, i.e. the distance of the peak from the nearest focal point. Both the peak and the focal points of the conic section surface lie on the optical axis. The tangent of the conic section surface in the peak then coincides with the above-named straight line. The coefficients, the conic constant K and the radius R are determined iteratively.

The aspheric function z(h) described by Equation 1 is only one example of how the shape of the aspherically shaped surface can be predetermined. Another possibility for predetermining the aspherical shape is to use the following relationship of Equation 2:

$$z(h) = \frac{h^2}{R\left(1+\sqrt{1-\frac{h^2}{R^2}}\right)} + \left(\frac{h}{h_0}\right)^2 \frac{\left(1-\left(\frac{h}{h_0}\right)^2\right)}{\sqrt{1-\frac{h^2}{R^2}}} \sum_{i=0}^{N} A_i \cdot Q_i \left(\frac{h}{h_0}\right)^2. \qquad \text{Equation 2}$$

Here $h_0$ is a standard radius for the variable h. The coefficients $A_i$ and $Q_i$ of the polynomial as presented in Equations 1 and 2, and the remaining variables used in these equations, are described in detail in the international standard ISO 10110-12, to which explicit reference is made at this point for illustration.

The aspheric functions describe the surfaces of the lenses firstly only in cross-section, thus in two dimensions. However, as a meniscus lens is rotationally symmetrical about its optical axis, the remaining points on the curved surfaces are obtained by simple rotation about the optical axis. In this sense, the conic section surface can then be regarded as a sphere, ellipsoid of revolution, paraboloid of revolution or hyperboloid of revolution, then the straight line or tangent lies in the corresponding tangential surface.

In a preferred design that makes a compact structure and makes simple handling possible, the aspect ratio lies between 0.5 and 2, particularly preferably at 1, wherein the center thickness and diameter of the meniscus lens are then identical. Supplementarily, or alternatively, the radius r, if the concave surface is spherically shaped, or the local radius, in the case of an aspherically shaped surface, lies in a range between 10 mm and approximately twice the diameter of the at least one meniscus lens; the lower value also approximately corresponds to the minimum local radius.

Glasses, plastics or semiconductors come into consideration as material for the meniscus lenses, wherein the specific selection is influenced by the wavelengths or wavelength ranges in which the beam shaper is to be used. Thus, for example, a refractive beam shaper in which the meniscus lenses are manufactured from silicon or germanium is advantageous for lasers which emit light in the infrared range. For example, heavy flint glass (S-TIH6) with a refractive index of $n_d=1.773$ or borosilicate crown glass (N-BK7) with a refractive index of $n_d=1.507$, in each case at a wavelength of $\lambda_d=546$ nm, come into consideration for glasses in the visible range, as these are glasses which are comparatively inexpensive. Quartz glass is particularly suitable as material for the meniscus lenses for applications in the ultraviolet wavelength range and for high-laser powers. If several meniscus lenses are combined with each other in the beam shaper, these can of course consist of different materials.

Compared with a beam shaper from the state of the art that alters the diameter of the beam, with the refractive beam shaper according to an embodiment of the invention, the alteration of the beam diameter can be achieved with only a single optical element, the at least one meniscus lens. Compared with a conventional optical system for altering the beam diameter, a substantial advantage is also that one meniscus lens is more compact, with respect to both the longitudinal extension along the optical axis and the diameter. Handling is simplified in this way, as typical diameters lie, for example, in the range of between two and five centimeters.

A single, fixed magnification or demagnification of the beam diameter can be achieved with just one individual meniscus lens. In a beam shaper for magnifying the beam diameter in which the concavely curved surface is spherically shaped, the magnification V, as a function of the refractive index n of the glass, the radius r of the concavely curved surface and the center thickness M of the meniscus lens, is described by Equation 3:

$$V = 1 + \frac{M}{r} \cdot \frac{n-1}{n}. \qquad \text{Equation 3}$$

In the visible range, if the named glasses are used, with an individual meniscus lens, magnifications of approximately up to a factor of 2.5 are possible. In the infrared range this is up to a factor of 3.5.

In order to obtain a higher flexibility in the choice of the magnification, several meniscus lenses may be arranged one behind the other along their optical axes. For example, a total magnification of 2.25 can be achieved by the sequential arrangement of two meniscus lenses of the same kind which have in each case a magnification of 1.5.

More than two lenses with different magnifications or demagnifications can also be arranged one behind the other along their optical axis—in the simplest case on an optical bench—for example, with four lenses magnifications up to a factor of 16, and with five lenses, magnifications up to a factor of 32, can be realized. The diameter of the lenses forms the only limitation. In addition, each of the meniscus lenses can be used, depending on the alignment on the optical axis, either as a magnifying or as a demagnifying element, which results in particular in a high flexibility in the choice of the beam expansion. In this way, intermediate magnifications which lie between the actual magnifications of the individual meniscus lenses—individually or in series—can also be set. Thus, 62 different magnifications can be set with just five meniscus lenses.

Although the arrangement on an optical bench is possible, in order to preserve the quality of the collimated beam it requires a precise alignment of the meniscus lenses relative to each other manually, which relates to their tilt about the optical axis on the one hand and also a centering on the optical axis on the other. This may be completely acceptable for a structure in which the magnifications or demagnifications need to be changed rarely or not at all, but in everyday industrial use, when, for example, the magnification is to be changed quickly, this procedure has proved impractical.

In an embodiment, the refractive beam shaper therefore also comprises alignment means for tilt-free and centered alignment of several meniscus lenses relative to each other on an optical axis, wherein this alignment is of course only tilt-free and centered within the framework of predetermined tolerances.

The angle range that can still be classified as tilt-free allows tolerances in a range of ±1.0° relative to the common optical axis, when a total system of several meniscus lenses arranged one behind the other is considered. In order to be able to arrange as many lenses as possible one behind the other, the tilt of an individual lens therefore should likewise be as small as possible, therefore the deviations of the position of the optical axis of the lens relative to the position of the optical axis of the total system or the collimated beam are preferably only ±0.07° for an individual lens. If only two lenses are to be arranged one behind the other, the maximum tolerance of ±1.0° can be used here.

The range that can still be classified as centered allows tolerances in the range of ±1 mm movement perpendicular to the optical axis, again based on a total system of several meniscus lenses arranged one behind the other. Between two meniscus lenses the tolerance preferably lies at ±0.140 mm in order to be able to combine together as many meniscus lenses as possible in one beam shaper or one beam-shaping system.

In an embodiment, these alignment means comprise a tube-shaped mount element with two openings into which the at least one meniscus lens is inserted. On both openings of the mount element, means of connection to in each case a corresponding further mount element with at least one further meniscus lens are formed. One lens can be inserted into each mount element, but several lenses can also be held in one mount element. If each mount element contains only one lens, the mount elements can likewise be designed very compactly and offer the highest possible degree of flexibility in respect of a combination of different meniscus lenses and thus different magnifications or demagnifications.

The mount elements can be manufactured from different materials, which can be selected depending, for example, on the demands that are made on the mount elements. If work is done at room temperature or temperature fluctuations do not play a role, for example, plastics such as polyetheretherketone (PEEK) and polyoxymethylene (POM), magnesium, such as AZ91-D, aluminium alloys, such as 6061T6, brass, such as ONSC46400, stainless steel, such as 1.4305, or titanium alloys, such as $Ti_6Al_4V$, can be used, wherein the metallic materials are preferably also anodized. In particular the last-named titanium alloy is very suitable for use with the glasses already named above because of its thermal properties, as this alloy and the glasses have similar coefficients of thermal expansion. Plastic is also a possible material for the mount elements. If the refractive beam shaper is subjected to high temperature fluctuations, the material for the lenses and the material for the mount elements should be chosen such that mechanical strains due to the thermal expansion of the two components, which could result in a deterioration of the imaging quality, are prevented.

It must be borne in mind that the meniscus lens—in each case within the framework of the acceptable tolerances—is held in the mount element with minimum tilt and with minimum decentering. The insertion into the mount element should therefore be carried out in the factory with a permanent connection and not left up to the user, even though, such solutions are conceivable if, for example, the meniscus lens is to be replaced. In this case, a purely positive-locking and/or friction-locking connection of the meniscus lens to the mount element can be advantageous. However, it will often be simpler to replace the mount element together with the meniscus lens, should this be necessary because of damage to the lens or to the mount element. A permanent connection of the meniscus lens to the mount element is therefore advantageous in the end. In an embodiment, the meniscus lens is therefore cemented to the mount element. For example, for this, an adhering agent that cures under UV light can be used, with the result that neither the lens nor the mount element is subject to thermal load. A soldering of the two parts or any other positive substance joining which fixes the meniscus lens in the mount element permanently, and optionally in a thermally stable manner, are also tried and tested means.

In order to prevent the meniscus lens from, on the one hand, slipping through, or, on the other hand, tilting during use, at least one annular stop is formed in the mount element, which prevents exactly this. Several lenses, one behind the other, can also be arranged in this way in one mount element if the lenses inserted later have a larger diameter than the meniscus lenses inserted first. The annular stop can be formed as a separate insert for the mount element, but it can also be formed on this, with the result that the stop and the mount element are manufactured in one piece. To prevent tilting, the stop can have, for example, a flat surface on which, in the inserted state, a flat surface formed on the meniscus lens lies. The latter flat surface can be formed, for example, on the side of the meniscus lens which contains the concavely curved surface, as there is normally sufficient space there. In addition, the stop need not be formed annular throughout, an open ring with several flat surfaces is also conceivable, for example, three surfaces arranged on the inner circumference in the manner of a three-point bearing.

In order to guide the meniscus lens in the mount element and ensure its centering, at least one partial area on the inner circumference of the mount element is preferably designed as an accurately-fitting guide for the at least one meniscus lens. This guide, in addition to the stop, prevents tilting. Accordingly, no adhering agent is applied to the at least one partial area. In order to make it possible, despite the accurate fit, to insert the meniscus lens into the mount element by means of slipping it through up to the stop and to prevent clamping because the static friction is too great, the cylindrical edge of the meniscus lens is smoothed down, for example, polished; the surfaces provided for the guide may also be smoothed down. The manufacture of the partial area in one piece on the inner circumference of the mount element is particularly advantageous in terms of manufacturing with lower-cost materials such as plastic, but also with brass or other metallic materials. Alternatively a separate adapter can also be used as guide, which, for example, is screwed into, clamped in or glued into the mount element. In the first case, the annular, accurately-fitting guide is replaceable, with the result that meniscus lenses of different diameters can also be inserted into one mount element, thus a mount element need not be matched exactly to the lens to be inserted or its diameter.

The accurately-fitting—within the framework of the predetermined tolerances—guide on the inner circumference need not be designed annular, for example, a three-point guide is also possible, in which the meniscus lens sits in three different partial areas which are arranged on the circumference at an angle of, for example, 120° to each other in each case.

The means for connecting two mount elements can be realized in different ways, wherein in each case it must be borne in mind that, after production of the connection between two mount elements, the meniscus lenses located therein are aligned with each other, thus that the optical axes of the individual meniscus lenses all lie on a common axis.

A simple possibility for realizing the connection means is to form one of the two openings of each mount element in the form of a male connector and the other of the two openings of the mount element in the form of a female connector, with the result that the mount element can be connected to a corresponding further mount element on each opening via a plug-in connection. In the simplest case, the male connector is clamped in the female connector, thus a friction-locking connection is produced. The plug-in connection can also be designed as a bayonet lock or can be supplemented by such a bayonet lock, in which two mount elements are put in each other by means of an insertion-rotation movement. For security, the bayonet lock can comprise a catch.

In an alternative design, the mount element can also be designed with two openings shaped in the same way, wherein connection means of the same kind, for example, with projections offset inwards from the circumference, are formed on the two openings. Two mount elements are then likewise connected to each other with an insertion-rotation movement, with the result that the projections, formed on the edge of the opening, of one mount element grip behind corresponding projections on the other mount element. This design can also be supplemented by a catch connection for security.

A high stability of a beam-shaping system of at least two mount elements connected to each other can also be achieved with a positive-locking connection if, for example, an internal thread is formed on one opening of the mount element and an external thread is formed on the other opening. In this way, the mount element on each opening can be connected to a corresponding further mount element via a screw connection. A screw connection is to be preferred when a simple handling is necessary.

In order to align two mount elements with each other and to prevent a tilting or canting of two mount elements, and thus a loss of adjustment of the meniscus lenses relative to each other, the mount elements preferably have bearing surfaces which are preferably formed circumferentially annular or conical to achieve a particularly high stability. A conical design makes the production of the connection easier. The bearing surfaces can also be provided with a chamfer on their edges, which likewise makes the production of the connection easier when inserted into each other.

Bearing surfaces are advantageous in particular in the case of a screw connection, as in this case, the play can then be designed to be more generous, which makes the production of the connections smoother. With a plug-in connection, the bearing surfaces can correspond to those surfaces which rest against each other in the manner of a male and a female connector.

In the case of an opening with a male connector or external thread, the bearing surface is likewise formed on the outer circumference or the outside of the mount element in this area. In the case of an opening with a female connector or internal thread the bearing surface is formed on the inner circumference or on the inside of the mount element in this area. The bearing surfaces are expediently smoothed down, for example, polished in the case of metallic mount elements.

An adjustment of the individual meniscus lenses relative to each other by a user is dispensed with in both types of connection, by the construction of the refractive beam shaper from several segments which can be connected to each other—the mount elements with meniscus lenses inserted therein—a plurality of different magnifications or demagnifications can be realized without the need for a particular adjustment to take place, as the individual meniscus lenses are already aligned tilt-free and centered in their mount elements within the framework of the respective tolerances, with the result that a combination of the individual segments even by untrained personnel is possible. As a whole, the handling of the refractive beam shaper for setting different magnifications is thus made substantially easier.

It is within the framework of the invention to connect the mount elements to each other not only directly via corresponding threads or plug-in connections, but also via spacer rings. In an embodiment, the refractive beam shaper therefore comprises at least one spacer ring for connecting two mount elements on two openings formed in the same way. This can be useful, e.g., when the light beam is to be magnified first and then demagnified again in order to realize, for example, intermediate stages in the beam expansion of a laser beam. It is also conceivable to design the two openings of a mount element in the same way, thus, for example, to provide both openings with an internal thread or with an external thread. In this case, the connection means as a basic principle comprise a spacer ring, via which two mount elements can be connected to each other. If two internal threads are provided on the mount element, the spacer ring is arranged inside with an external thread; where an external thread is formed in each case on the two openings of the mount element, the two mount elements are connected via a spacer ring with an internal thread. Via the spacer rings, not only can screw connections between openings configured in the same way be produced, plug-in connections with or without bayonet locks can also be realized in this way.

The refractive beam shaper may be supplemented by optical elements which allow a greater flexibility when in use, these optical elements may likewise be arranged in their own mount elements, with the result that they can be combined as desired with the mount elements that hold the meniscus lenses.

Thus, the refractive beam shaper in an embodiment comprises a wavelength-adaptive correction element for correcting aberrations at actual wavelengths which lie in a predetermined range around a target wavelength, wherein the beam shaper is designed for operation at the target wavelength, and wherein the wavelength-adaptive correction element is formed to transform a divergent or convergent light beam at the actual wavelength into a collimated light beam.

While a beam shaper is designed according to the selection of the materials for the lenses and the individual optical elements such that it transforms a collimated beam at a target wavelength which corresponds, for example, to the starting wavelength of a laser, downstream of which the beam shaper is connected, back into a collimated beam, deviations in the imaging occur when the light has an actual wavelength deviating from the target wavelength. The starting light beam is then no longer convergent, but divergent or convergent depending on whether the actual wavelength is greater or smaller than the target wavelength. With the wavelength-adaptive correction element, a divergent or convergent beam at the actual wavelength can be transformed back into a collimated beam.

In an embodiment, the wavelength-adaptive correction element comprises three correction lenses or correction lens groups in the form of cemented components, wherein functioning with as few lenses as possible is advantageous. In an embodiment, the wavelength-adaptive correction element comprises a first outer, a central and a second outer correction lens, wherein at least one of the correction lenses—preferably one of the outer correction lenses—has at least one aspherical surface. By means of the aspherical surface(s) further aberrations which are caused by the actual wavelength deviating from the target wavelength can be corrected.

In order to make an adaptation to different wavelengths from a wavelength range around the target wavelength possible, at least one of the correction lenses is arranged movable compared with the other two correction lenses along the optical axis. If only one of the outer lenses has an aspherical surface, this is preferably arranged fixed, i.e., for example, fixedly incorporated in the mount element, whereas the other outer correction lens is then movable compared with this and the likewise fixedly arranged central correction lens. This movement can take place, for example, by means of corresponding, rotatable rings or pins on the mount element, such as are known for photographic objective lenses. The greater the possible displacement lengths in the wavelength-adaptive correction element are, the greater the wavelength range is in which corrections for actual wavelengths deviating from the target wavelength are possible. The individual correction lenses can be constructed from identical materials, but this is not mandatory.

A further optical element which increases the flexibility of the refractive beam shaper is a zoom element, which is optionally likewise part of the beam shaper, for setting a continuous intermediate magnification or demagnification. The zoom element is also preferably arranged in a mount element of its own, which makes connection to other mount elements easier on the one hand and also makes the setting of the zoom element easier on the other hand. While only magnifications or demagnifications of the beam diameter in discrete steps can be achieved with the arrangement of individual meniscus lenses one behind the other, with the help of the zoom element it is possible to continuously set intermediate magnifications which cover the range between two discrete stages, wherein when the maximum magnification of the zoom element is achieved the latter can, for example, be removed from the beam path and replaced by a corresponding meniscus lens.

In an embodiment, the zoom element comprises a first outer, a central and a second outer zoom lens group, wherein preferably one of the outer zoom lens groups and the central zoom lens group can be moved compared with the other outer zoom lens group along the optical axis. In an embodiment, the zoom lens group that cannot be moved has an aspherical surface for correcting aberrations caused by the insertion of the zoom element.

The zoom element can be constructed substantially mirror-symmetrical and can comprise, for example, as first and second outer zoom lens group, a biconvex element made of the same material and, as central zoom lens group, a biconcave element made of another material, if individual lenses are used. However, this symmetry is broken by the aspherical surface on the outer side of the stationary outer zoom lens group. All zoom lens groups can also be constructed from identical material. However, if different materials are used, the zoom element can be achromatically corrected, which makes use at different wavelengths possible.

One outer zoom lens group and the central zoom lens group are moved together, i.e., coupled, but the displacement lengths are different, the coupling is non-linear. The adjustment can be carried out by means of corresponding rings or pins on the outer circumference, for example, of the mount element in which the zoom element is arranged for easier connection to the meniscus lenses of the beam shaper.

It is understood that the features mentioned above and those yet to be explained in the following are applicable, not only in the stated combinations, but also in other combinations or singly, without departure from the scope of the present invention.

BRIEF DESCRIPTION OF THE DRAWINGS

The invention is explained in further detail below by way of example with reference to the attached drawings which also disclose features essential to the invention. There are shown in.

DETAILED DESCRIPTION

Figure 1:
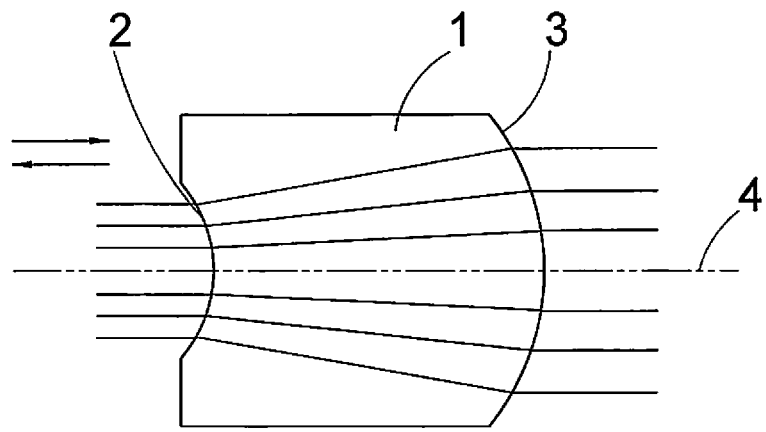
FIG. 1 depicting a basic form of a refractive beam shaper with beam profile.

The basic form of a refractive beam shaper and the beam profile through this beam shaper is firstly represented in FIG. 1. The beam shaper comprises at least one, in the example shown precisely one, meniscus lens 1. This has a concavely curved surface 2 and a convexly curved surface 3. Either a light beam can enter the meniscus lens 1 through the concavely curved surface 2 and then exit the meniscus lens 1 on the convexly curved surface 3, or it enters the meniscus lens 1 via the convexly curved surface 3 and exits it again via the concavely curved surface 2. The two possible light paths are identified by corresponding arrows. Both surfaces 2 and 3 have such curvatures that a collimated light beam entering the at least one meniscus lens 1 parallel to an optical axis 4 thereof exits it again, as a collimated light beam, with a diameter that is altered compared with the entering light beam. Depending on the light path, the diameter of the collimated beam is thus either demagnified or magnified. In order to ensure that an entering collimated light beam is also still collimated after exit and has the same intensity over the entire diameter, at least one of the two surfaces 2, 3 has a predetermined aspherical shape to prevent aberrations, in particular spherical aberration, coma and astigmatism.

Compared with the use of spherical surfaces, the use of an aspherical surface produces a correction of the aberrations. In principle, a beam shaping is also possible with two spherical surfaces, but then only as an approximation for small angles or for laser beams with a diameter of less than 3 mm, which is not sufficient for many applications. A series connection of different such elements with two spherical surfaces or two lenses is not possible for this reason, as the starting beam already has too large a diameter for the second stage and aberrations become noticeable in a disruptive manner. By the design of the beam shaper with a meniscus lens 1 in which at least one of the two surfaces 2 or 3 is aspherically shaped in a predetermined manner, beam diameters of more than 5 mm can also be set with a high degree of accuracy.

Either the concavely curved surface 2 is aspherically shaped or the convexly curved surface 3 is aspherically shaped. In particular cases, when, for example, not only aberrations are to be prevented but also the intensity distribution in the beam is to be changed—e.g., from a Gaussian-shaped profile to an almost homogeneous profile, also called super-Gaussian or top-hat profile—it can be advantageous to also form both surfaces 2 and 3 aspherical. All profile shapes between a normal Gaussian distribution and a top-hat profile, i.e., lower-order Gaussian distributions, other than the top-hat profile can also be predetermined as intensity distribution, should it be necessary.

Figure 2:
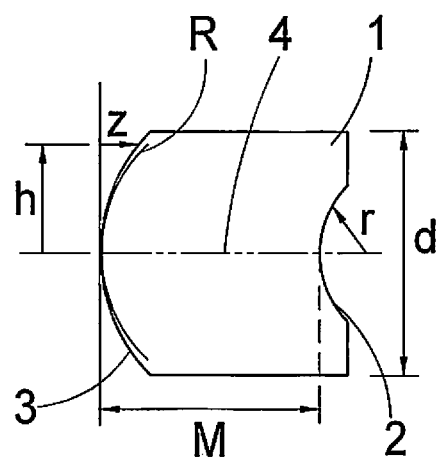
FIG. 2 depicting an illustration of the most important variables for the aspheric calculation.

Each one of the aspherically curved surfaces can be described by an aspheric function $z(h)$ as the distance to a straight line normal to the optical axis. h is the distance to the optical axis on this straight line. The individual variables are illustrated in FIG. 2, wherein by way of example, the convexly curved surface 3 is aspherically shaped here. The center thickness is indicated with M, the diameter with d. The aspheric function $z(h)$ is determined iteratively, wherein a minimum local radius of the concavely curved surface r, the center thickness M of the respective meniscus lens 1 on the optical axis 4, a material from which the respective meniscus lens 1 is manufactured, and the aspect ratio, i.e., the ratio between center thickness M and diameter d of the respective meniscus lens 1 are predetermined as parameters. In the case of two aspherical surfaces, further parameters are needed for the defining, as a further field of parameters the intensity distribution—for example, as described previously—of the exiting light beam is then also predetermined here. The surface described by the aspheric function $z(h)$ can be clearly defined with these specifications. For example, the aspherically curved surface can be described by the relationship of Equation 1:

$$z(h) = \frac{h^2}{R\left(1 + \sqrt{1 - (1+K)\frac{h^2}{R^2}}\right)} + \sum_{i=2}^{N} A_{2i} h^{2i} \quad \text{Equation 1}$$

wherein K is the conic constant, i and N are natural numbers and $A_{2i}$ is the coefficients of a polynomial in h. R is the radius of a conic section surface in a peak which lies on the optical axis, i.e. the distance of the peak of this conic section surface to its nearest focal point, wherein focal point and peak lie on the optical axis. The straight line then corresponds to the tangent of the conic section surface at this peak.

Figure 3:
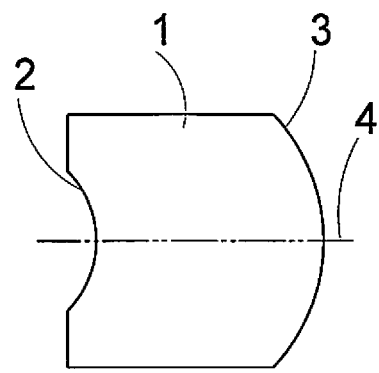
FIG. 3 depicting a first design of a refractive beam shaper with a meniscus lens.
Figure 4:
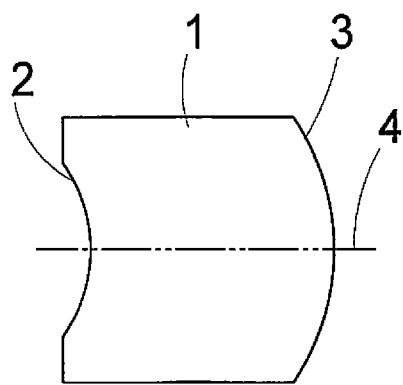
FIG. 4 depicting a further design of a refractive beam shaper with a meniscus lens.
Figure 5:
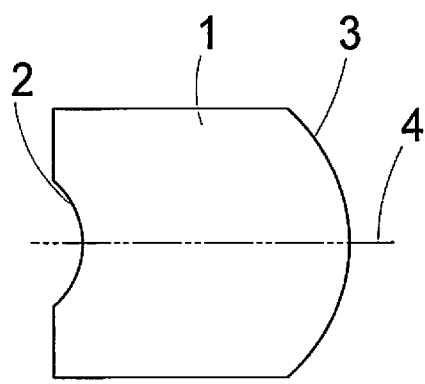
FIG. 5 depicting a third design of a refractive beam shaper with a meniscus lens.

In FIG. 3 and FIG. 4 refractive beam shapers are represented which comprise in each case a meniscus lens 1 in which only one of the two surfaces 2, 3 is aspherically shaped. In FIG. 5 a beam shaper is represented in which the meniscus lens 1 has two aspherically curved surfaces 2, 3.

In the meniscus lenses 1 shown in FIG. 3 and FIG. 4, the aspect ratio is approximately 0.89, the diameter of the meniscus lens 1 is thus only slightly larger than the center thickness. In the case of the meniscus lens 1 shown in FIG. 5, the aspect ratio lies at 0.95. The diameter of the lenses is, in every case, only 25 mm, thus it is a very compact beam shaper.

The meniscus lens 1 shown in FIG. 3 of a beam shaper has a concavely curved surface 2 which is spherically shaped with a radius of 10 mm. The convexly curved surface 3 is aspherically shaped.

The meniscus lens 1 of the beam shaper shown in FIG. 4, on the other hand, has a concavely shaped surface 2 which is aspherically shaped, whereas the convexly curved surface 3 is spherically shaped with a radius of 22.5 mm.

In the design shown in FIG. 5 of a beam shaper, the meniscus lens 1 has two aspherically curved surfaces, both the concavely curved surface 2 and the convexly curved surface 3 are aspherically shaped.

In all three cases, borosilicate crown glass, also known by the abbreviation N-BK7, was used as material for the meniscus lens 1. Like borosilicate crown glass, heavy flint glass (S-TIH6) can also be used in the visible range, both glasses are inexpensive. Of course, all other glasses, and also plastics, also come into consideration in principle. Normal flint glass or for example Zerodur® can also be used. Quartz glass is also suitable if the beam shaping is to be carried out at wavelengths in the UV range and/or for high laser powers. For the infrared range, silicon or germanium also come into consideration as material for the meniscus lens 1, to name but a few examples.

In the meniscus lenses 1 shown in FIGS. 3-5, the aspect ratio lies approximately at 1, but it can be chosen in a larger range which may lie between 0.5 and 2. The local radius r of the concavely curved surface 2 can be chosen, for example, from a range between 10 mm and approximately twice the diameter—thus approximately 50 mm in relation to the examples shown in FIGS. 3-5—of the meniscus lens 1, in order to achieve a good imaging quality. The radius of a spherically, convexly curved surface 3 then results from the condition that the convexly curved surface 3 and the concavely curved surface 2 are arranged concentric to each other, or that the corresponding radii start from the same origin. In the case of an aspherically shaped surface, the spherical surface that comes closest to the aspherically shaped surface is arranged concentrically.

With the previously described simple design of the refractive beam shaper as an individual meniscus lens 1, the diameter of a collimated light beam can already be magnified or demagnified sufficiently for many applications. In contrast to the state of the art, it is possible to function with a single lens, because of the aspherical shape of at least one of the two optically active surfaces, i.e., the concavely curved surface 2 and/or the convexly curved surface 3, a high beam quality can be achieved, wherein an elaborate adjustment of several elements relative to each other, such as is necessary in the state of the art, is dispensed with during production of the beam shaper. In addition, the refractive beam shaper, as it has hitherto previously been described, functions with a smaller number of optically active surfaces, as only a single element is used, while in the beam expanders known in the state of the art at least two optical elements spatially separated from each other are used, with the result that at least four optically active surfaces are to be considered.

Figure 6A:
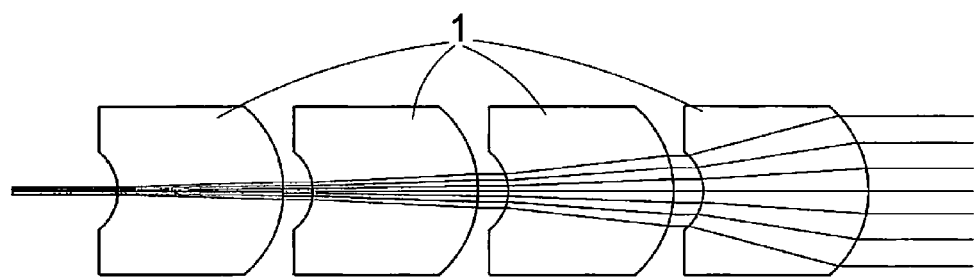
FIGS. 6a, b depicting a beam shaper with several meniscus lenses in two designs.

With a single meniscus lens 1, only a single magnification can be realized which as a rule is not greater than 2.5 in the visible range and not higher than 3.5 in the infrared range, if a compact construction which can easily be inserted into the path length that is present is sought, for example, with the dimensions as they have been described in connection with FIGS. 3-5. However, precisely the compact construction also makes it possible to arrange several meniscus lenses 1 one behind the other along their optical axis 4, whereby a greater alteration of the diameter of the light beam compared with an individual meniscus lens 1 results. Such an example is shown in FIG. 6a. A laser beam coming from the left with a small diameter of 1.4 mm is expanded, when it passes through the refractive beam shaper which is formed as a cascade of meniscus lenses 1, until the diameter of the laser beam achieves almost the value of the diameter of a meniscus lens 1. In the arrangement shown in FIG. 6a, the beam shaper comprises four meniscus lenses 1, but the system for beam shaping can also comprise fewer or more meniscus lenses depending on how large the diameter of the light beam is to be at the end after exiting the refractive beam shaper. In the example shown, a magnification by a factor of 16 takes place. If the light beam in the example shown in FIG. 6a is to be expanded still further after passing through the fourth meniscus lens 1 arranged furthest to the right, meniscus lenses with larger diameters can correspondingly also be used.

Figure 6B:
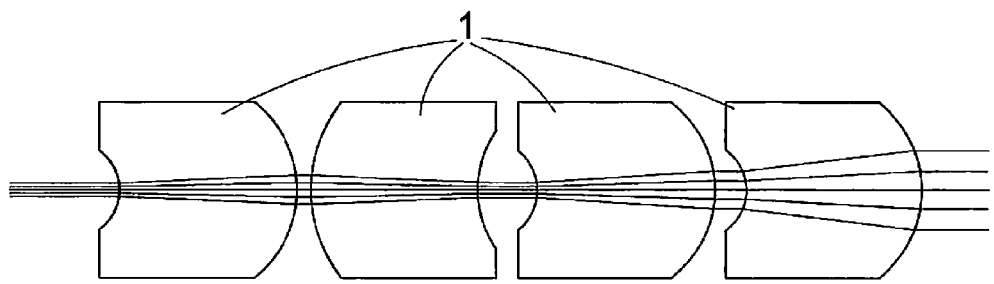

There is also the possibility of setting intermediate magnifications, arranging one or more meniscus lenses 1 in the beam shaper so as to demagnify the beam, i.e., rotating the optical axis of the meniscus lens 1 by 180° about the optical axis of the total system, with the result that the convexly curved surface points in the direction of the entering beam. Such a beam shaper or a beam-shaping system of several meniscus lenses is represented in FIG. 6b. Here, a magnification of the starting beam—with a starting diameter of 2.1 mm—by a factor of 5⅓ takes place. Finally, the beam guide can also be reversed, with the result that the diameter of the light beam is demagnified as a whole.

The meniscus lenses 1 in a beam shaper can be arranged, for example, on an optical bench, which requires, however, a precise adjustment of the meniscus lenses 1 relative to each other, in the sense that the optical axes of all meniscus lenses 1 must lie one on top of the other, thus the meniscus lenses 1 are centered relative to each other and also in respect of the beam entry within the framework of predetermined tolerances. This also includes the fact that the optical axes of the lenses are tilted relative to each other only minimally, i.e., within acceptable tolerances. Greater deviations would otherwise result in a substantial reduction of the beam quality. Accordingly, a very precise adjustment is necessary, which is associated with substantial expenditure of time and makes a simple change of the magnification difficult.

Figure 7:
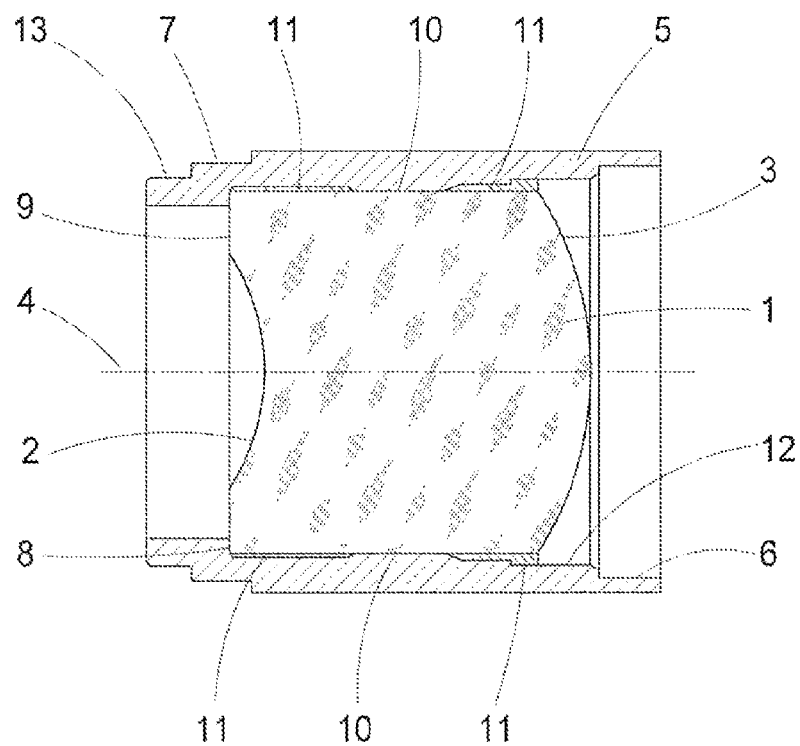
FIG. 7 depicting a beam shaper in which the meniscus lens is inserted into a mount element.

In order to prevent this, the at least one meniscus lens 1 can be inserted into a tube-shaped mount element 5, as represented by way of example with inserted lens in FIG. 7. The mount element 5 can consist, for example, of an anodized, metallic material, for example, of brass, for use in a laboratory environment at constant temperatures in particular materials such as aluminium alloys or a titanium alloy such as $Ti_6Al_4V$ can be used, as their coefficients of thermal expansion behave similarly to those of glasses. The mount elements 5 can also be manufactured from plastic. For use in areas which are exposed to high temperature fluctuations, Zerodur® and Macor® are also suitable, the lenses can also be manufactured from the former material. These materials are also very useful for meniscus lenses 1 for the infrared range made of germanium or silicon, as the coefficients of expansion of silicon and germanium lie below those of usual glasses. If the refractive beam shapers are subjected to high temperature fluctuations, the material for the lenses and the material for the mount elements should be chosen such that mechanical strains due to the thermal expansion of the two components, which could result in a deterioration of the imaging quality, are prevented.

The mount element 5 shown in cross-section in FIG. 7 is tube-shaped and therefore has two openings, wherein, on both openings of the mount element 5, means of connection to in each case a corresponding further mount element with at least one further meniscus lens 1 are formed. For example, one of the two openings of the mount element 5 can be formed in the form of a male connector and the other of the two openings can be formed in the form of a female connector, with the result that the mount element can be connected to a corresponding further mount element 5 on each opening via a plug-in connection. In the present example, an internal thread 6 is formed on one opening of the mount element 5 and an external thread 7 is formed on the other opening of the mount element 5. In this way, the mount element 5 can be connected in a positive-locking manner to a corresponding further mount element 5 on each opening via a screw connection, then several mount elements 5 can be connected to form a total mount.

In order to make possible an adjustment-free arrangement one behind the other of different meniscus lenses 1 to form a cascade, the individual meniscus lenses 1 must be adjusted and fixed in the respective mount elements 5 beforehand. In order to prevent the at least one meniscus lens 1 from slipping through during insertion and to prevent the inserted meniscus lens from tilting, the mount element 5 has firstly at least one annular stop 8 which is manufactured with a high degree of precision. The meniscus lens 1 can then be inserted into the mount element or the mount 5 from above, for example, with the result that a flat edge area 9 of the meniscus lens 1, from which the concavely curved surface 2 is formed, bears on the stop 8. A tilting is prevented in this way. Several meniscus lenses 1 can also be inserted into a mount element 5 if these have different diameters and the stops correspondingly likewise have different diameters.

In order to ensure a centering of the at least one meniscus lens 1 in the mount element 5, at least one partial area on the inner circumference of the mount element 5 is designed as an accurately-fitting guide 10. This partial area can be circumferential, but three partial areas can also be formed, for example, in the form of a three-point bearing or three-point guide on the inner circumference of the mount element 5. The manufacture in one piece, as represented in FIG. 7, is not strictly necessary. For example, a corresponding ring which can be screwed in can also be provided as guide. To fix the meniscus lens 1 in the mount element 5, it is cemented to the mount element 5 with the help of an adhering agent, for example, with an adhering agent 11 that cures under UV light. Adhering agents that cure in another way can also be used, the meniscus lens 1 can likewise also be soldered to the mount element 5 or also be connected to it only in a positive-locking manner, instead of by positive substance joining.

Of course, a centering can also be carried out without using a guide 10. The mount element 5 is then positioned perpendicularly, for example, with the result that the meniscus lens 1 bears on the stop 8 already in a flat manner and thus tilt-free within the framework of the tolerances, preferably with a flat partial surface on the side of the concavely curved surface 2. The meniscus lens can then be moved horizontally on this stop until a position that is centered within the framework of the tolerances is achieved. It is then fixed in this position by means of the adhering agent 11. The adhering agent 11 can also already be applied to the corresponding areas in advance, with the result that a slipping of the meniscus lens 1 out of a chosen position is made difficult. If the desired end position of the meniscus lens is set by movement on the flat surface of the stop 8, the adhering agent is cured.

Figure 8:
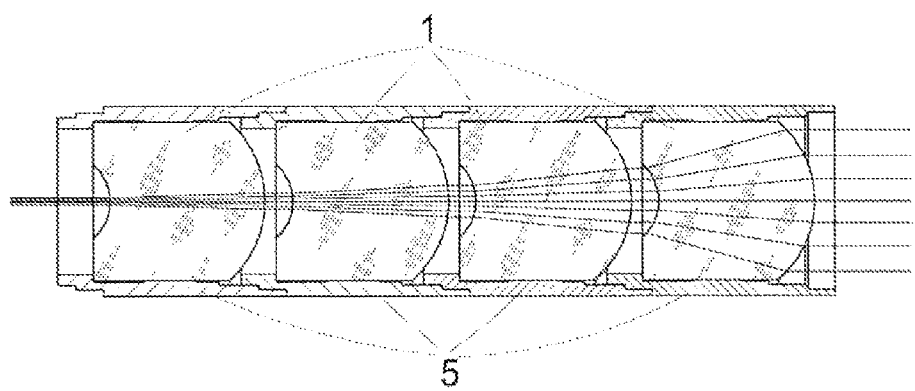
FIG. 8 depicting a beam shaper in which several mount elements with meniscus lenses are connected to each other.

If the meniscus lens 1 in the mount element 5 is adjusted in respect to tilting and centering and fixed in this position, several mount elements 5 can be connected by means of the screw connection without a separate adjustment of the individual meniscus lenses 1 relative to each other being necessary. A combination of such mount elements 5 is represented in cross-section by way of example in FIG. 8. Bearing surfaces 12 and 13 which are shown in FIG. 7 and formed in the area of the openings ensure the adjustment-free connection. The bearing surface 12 in the case of the female connector-shaped opening with the internal thread 6 is designed as an inwardly circumferential, annular surface. In the case of the male connector-shaped opening with the external thread 7, the bearing surface 13 is also designed as an outwardly circumferential, annular surface; both bearing surfaces 12 and 13 are preferably polished if the mount element 5 is metallic. With the two bearing surfaces 12 and 13 shown here, the surface normals are always perpendicular to the optical axis, thus the surfaces lie parallel to this axis. This design is not mandatory, thus, e.g., a conical shaping with internal and external cones is also possible. The bearing surfaces 12 and 13 also need not be formed completely circumferential, a configuration in the form of several areas, spaced apart from each other on the circumference, with bearing surfaces is likewise possible.

For a particularly great alteration of the beam diameter, in particular for a large magnification of the diameter, it can be necessary to use meniscus lenses 1 with different diameters and, depending on this, also mount elements 5 with different diameters. Mount elements 5 with different diameters can then be connected to each other, for example, with the help of corresponding adapter rings.

Figure 9:
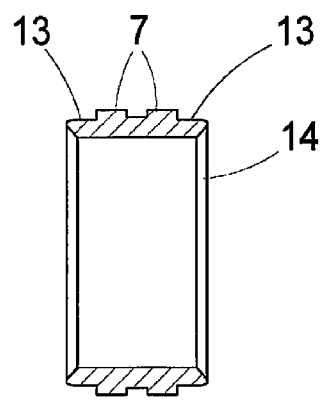
FIG. 9 depicting a first spacer ring for connecting two mount elements.
Figure 10:
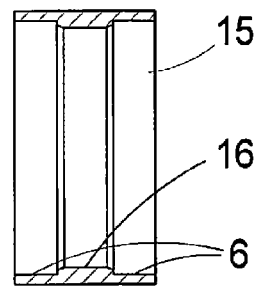
FIG. 10 depicting a second spacer ring for connecting two mount elements.
Figure 11:
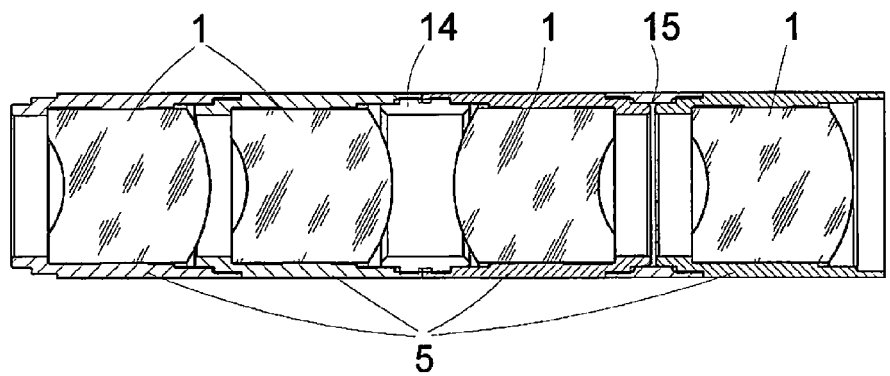
FIG. 11 depicting four mount elements with meniscus lenses which are partly connected to each other via spacer rings.

In addition, the beam shaper can also comprise at least one spacer ring which serves to connect two mounts 5 on two openings formed in the same way. This can be advantageous for example when a change is to be made from a magnification of the beam to a demagnification again. In this way, for example, different intermediate magnifications can be realized in the beam expansion. A first such spacer ring 14 is represented, for example, in FIG. 9, it has two external threads 7 which can be screwed with the corresponding internal threads 6 of the mount element 5, as well as two bearing surfaces 13. Another example is shown in FIG. 10, the spacer ring 15 represented there has two internal threads 6 and a bearing surface 16, the dimensions of which along the optical axis correspond to two bearing surfaces 12 of a mount element or of the mount 5. In this way, every two mount elements 5 can be connected to each other on their external threads, several mount elements 5 connected to each other then form a total mount for the beam shaper. A beam shaper in which such spacer rings are used is shown, for example, in FIG. 11.

Figure 12:
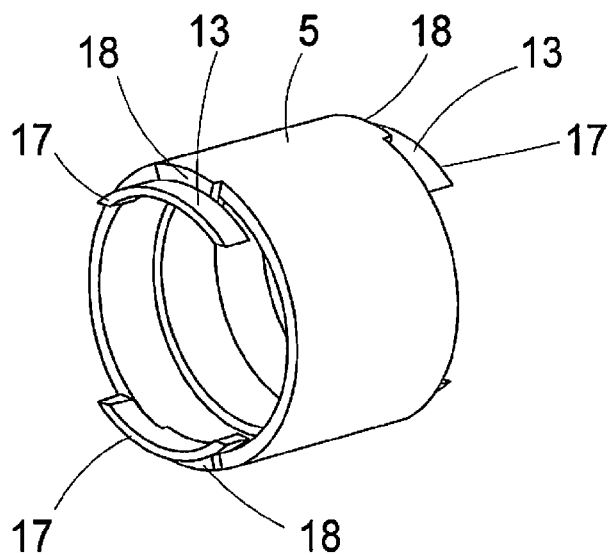
FIG. 12 depicting a mount element in which both openings are formed in the same way.

A further design of a mount element 5 is represented in FIG. 12. In this design, both openings are formed in the same way, they can be combined with each other without spacer rings because of the particular design of the connection means on the openings, which makes the compilation of different magnifications by simpler handling substantially easier, as, although the respective mount element 5 furthermore has to be rotated by 180° about the optical axis in the case of a change from a magnification to a demagnification, no aids are necessary for assembly.

Projections 17 are formed on the openings of the mount element 5 shown in FIG. 12. In each case two projections 17 per opening are represented, but three or more projections 17 can also be provided in the case of a corresponding dimensioning. Each projection 17 here is formed as part of an annular ring segment, its outer circumference forms a bearing surface 13 which, in the case of a metallic mount element 5 and manufacture in one piece, is preferably polished and contributes to an adjustment-free connection of two mount elements 5. However, the projection 17 can also be manufactured separately and then connected to the mount element 5. In the representation shown in FIG. 12, each projection 17 is formed or arranged on a protuberance 18, which makes assembly easier, as two mount elements 5 are then in contact with each other only in the area of the protuberance 18 when screwed in, with the result that only the corresponding surfaces on the protuberances 18 have to be manufactured with a high degree of precision, and not the whole area of the opening. At the same time, they serve as a stop for limiting the rotational movement. The formation of protuberances 18 is not strictly necessary, but it makes manufacture easier.

Figure 13:
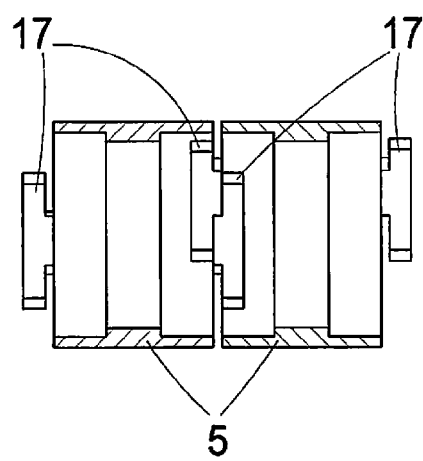
FIG. 13 depicting a connection of two such mount elements, as represented in FIG. 12.

When two mount elements 5 are connected, they are firstly aligned with each other such that the projections 17 of the openings, opposite each other, of two mount elements 5 do not hinder each other when inserted; in the design shown in FIG. 12 therefore a second mount element 5 would be rotated by 90° on the optical axis. When the two mount elements 5 are put together, then the bearing surfaces 13 of one mount element 5 lie on the inner circumference or on a stop surface 12 of the other mount element 5, and vice versa. By means of a rotational movement, the projections 17 of the two mount elements 5 are then interlocked with each other, with the result that the two mount elements 5 can be prevented from being pulled apart, they are in each case in contact with a protuberance 18 of the other mount element 5 on their undersides facing the opening of the associated mount element 5. The rotational movement is limited by the protuberances 18 in order to ensure that a stable connection is produced. Two mount elements 5 connected to each other are represented in FIG. 13.

The connection via projections gripping behind each other can also be supplemented by a catch connection, for example, by forming, on the bearing surfaces 13 of the projections 17, lugs which engage in corresponding depressions on the inner circumference or the stop surfaces 12 in the connected state.

The projections 17 can also be equipped as a spring element, with the result that, when inserted, a friction-locking connection of two mount elements 5 is also produced in addition to the positive-locking connection via two projections 17. In the case of a correspondingly strong spring action, the positive-locking interconnection can also be dispensed with, then simply putting them together without rotational movement is sufficient—in this case a specific male-female connection is realized in which male connector and female connector are identically shaped.

Finally, the mount elements 5 can also hold further optical elements, which increase the flexibility of the beam shaper. Thus, for example a wavelength-adaptive correction element—not shown—can be provided which is preferably likewise arranged in a mount element 5 of its own, and which makes operation of the beam shaper possible even at wavelengths which deviate from a target wavelength for which the beam shaper is designed. A zoom element—likewise not shown—can also be provided which is preferably likewise arranged in a mount element 5 of its own, and with which intermediate magnifications can be continuously set.

The refractive beam shaper described previously is a compact optical system which provides the user with a large number of magnifications, for example, for the beam expansion of laser beams, wherein no renewed adjustment of the optical system is necessary to change the magnification.

LIST OF REFERENCES 1 meniscus lens
2 concavely curved surface
3 convexly curved surface
4 optical axis
5 mount element
6 internal thread
7 external thread
8 stop
9 edge area
10 guide
11 adhering agent
12, 13 bearing surface
14, 15 spacer ring
16 bearing surface
17 projection
18 protuberance
M center thickness
d diameter

The invention claimed is:

1. A refractive beam shaper, comprising a plurality of meniscus lenses arranged along their respective optical axes, wherein each meniscus lens has:
  a concavely curved surface for entry or exit of a light beam, and
  a convexly curved surface for exit or entry of the light beam,
  wherein both curved surfaces have curvatures such that a collimated light beam entering the meniscus lens parallel to an optical axis of the meniscus lens thereof exits as a collimated light beam with a diameter that is altered compared with the entering light beam, and
  wherein, to prevent aberrations, at least one of the two curved surfaces has a predetermined aspherical shape.

2. The refractive beam shaper according to claim 1, wherein:
  the at least one of the two curved surfaces having a predetermined aspherical shape is defined by an aspheric function z(h) as a distance to a straight line normal to the optical axis, with h being the distance to the optical axis on the straight line, and
  wherein a minimum local radius of the concavely curved surface r, the center thickness of the respective meniscus lens on the optical axis, a material from which the respective meniscus lens is manufactured, the aspect ratio between center thickness and diameter of the respective meniscus lens and, if both curved surfaces are aspherically curved, an intensity distribution for the exiting light beam, are predetermined as parameters.

3. The refractive beam shaper according to claim 2, wherein, in cross-section, an intensity distribution for the exiting light beam has a profile that follows a Gaussian distribution.

4. The refractive beam shaper according to claim 2, wherein the concavely curved surface is spherically shaped and the convexly curved surface is defined by the relationship:

$$z(h) = \frac{h^2}{R\left(1 + \sqrt{1 - (1+K)\frac{h^2}{R^2}}\right)} + \sum_{i=2}^{N} A_{2i} h^{2i}$$

wherein K is a conic constant, i and N are natural numbers, $A_{2i}$ are coefficients of a polynomial in h, and R is a distance of a peak of a conic section surface to a nearest focal point of the conic section surface, wherein peak and focal point lie on the optical axis, with the result that a tangent of the conic section surface in the peak corresponds to the straight line.

5. The refractive beam shaper according to claim 2, wherein an aspect ratio lies between 0.5 and 2, or the radius r lies in a range between 10 mm and approximately twice the diameter of the respective meniscus lens, or both.

6. The refractive beam shaper according to claim 1, wherein the plurality of meniscus lenses are manufactured from materials selected from the group consisting of glass, plastic, and semiconductors, including borosilicate crown glass (N-BK7), heavy flint glass (S-TIH6), quartz glass, silicon and germanium.

7. The refractive beam shaper according to claim 1, wherein at least two of the plurality of meniscus lenses are arranged so as to magnify the diameter of the beam and the others of the plurality of meniscus lenses are arranged so as to demagnify the diameter of the beam.

8. The refractive beam shaper of claim 1, wherein the plurality of meniscus lenses are aligned with each other tilt-free and centered within a framework of predetermined tolerances via alignment means.

9. The refractive beam shaper according to claim 8, wherein at least one of the plurality of meniscus lenses is inserted into a tube-shaped mount element, comprising an anodized, metallic material, the mount element defining two openings, wherein the mount element is configured at each opening to connect to a corresponding further mount element of a further meniscus lens.

10. The refractive beam shaper according to claim 9, wherein the at lease one meniscus lens is cemented to the mount element of an adhering agent that cures under UV light, is soldered to the mount element, or is connected to the mount element in a positive-locking manner.

11. The refractive beam shaper according to claim 9, wherein in the mount element at least one stop is formed which prevents the at least one meniscus lens from slipping through when inserted into the mount element and prevents the inserted meniscus lens from tilting.

12. The refractive beam shaper according to claim 9, wherein at least one partial area on an inner circumference of the mount element is designed as an accurately-fitting guide for the at least one meniscus lens enabling centering of the lens in the mount element.

13. The refractive beam shaper of claim 9, wherein on a mount element, a bearing surface is formed for adjustment-free connection to the corresponding further mount element.

14. The refractive beam shaper according to claim 9, wherein one of the two openings of the mount element comprises a male connector and the other of the two openings comprises a female connector, such that the mount element can be connected to the corresponding further mount element at each opening via a plug-in connection.

15. The refractive beam shaper according to claim 9, wherein an internal thread is formed at one opening of the mount element and an external thread is formed at the other opening, such that the mount element at each opening is capable of being connected to the corresponding further mount element via a screw connection.

16. The refractive beam shaper of claim 14, further comprising at least one spacer ring for connecting the two mount elements onto two openings.

17. The refractive beam shaper according to claim 9, wherein either an internal thread or an external thread is formed on both openings of the mount element (5), and two mounts can be connected via a corresponding spacer ring.

18. The refractive beam shaper according to claim 9, wherein on both openings of the mount element, connection means of the same kind are formed which comprise projections for engaging in and screwing into the further mount element, such that the projections of the two mount elements are arranged gripping one behind the other in a connected state.

19. The refractive beam shaper according to claim 1, further comprising at least one wavelength-adaptive correction element, which is arranged in a mount element of its own, for correcting aberrations at actual wavelengths which lie in a predetermined range around a target wavelength, wherein the beam shaper is designed for operation at the target wavelength, and the wavelength-adaptive correction element is formed to transform a divergent or convergent light beam at the actual wavelength into a collimated light beam.

20. The refractive beam shaper according to claim 19, wherein the wavelength-selective correction element comprises a first outer, a central and a second outer correction lens, of which at least one correction lens has at least one aspherical surface.

21. The refractive beam shaper according to claim 20, wherein one of the two outer correction lenses has an aspherical surface and the other of the two outer correction lenses is moveable relative to the other two lenses along the optical axis.

22. The refractive beam shaper according to claim 1, further comprising a zoom element for setting a continuous intermediate magnification, the zoom element arranged in a mount element of its own.

23. The refractive beam shaper according to claim 22, wherein the zoom element comprises a first outer, a central and a second outer zoom lens group, wherein one of the outer zoom lens groups and the central zoom lens group is movable relative to the other outer zoom lens group along the optical axis, and wherein the zoom lens group that cannot be moved has an aspherical surface.

* * * * *